United States Patent
Howe

(10) Patent No.: US 10,807,582 B2
(45) Date of Patent: Oct. 20, 2020

(54) EFFLUENT PROCESSING APPARATUS AND METHOD FOR A VEHICLE AIR BRAKE CHARGING SYSTEM

(71) Applicant: Bendix Commercial Vehicle Systems LLC, Elyria, OH (US)

(72) Inventor: Stephen Howe, Cuyahoga Falls, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 283 days.

(21) Appl. No.: 15/937,129

(22) Filed: Mar. 27, 2018

(65) Prior Publication Data

US 2019/0299957 A1 Oct. 3, 2019

(51) Int. Cl.
| | |
|---|---|
| *B60T 17/00* | (2006.01) |
| *B01D 17/02* | (2006.01) |
| *B01D 45/16* | (2006.01) |
| *C02F 1/40* | (2006.01) |
| *C02F 101/32* | (2006.01) |

(52) U.S. Cl.
CPC ............ *B60T 17/004* (2013.01); *B01D 17/02* (2013.01); *B01D 45/16* (2013.01); *C02F 1/40* (2013.01); *C02F 2101/32* (2013.01)

(58) Field of Classification Search
CPC ....... B60T 17/004; B01D 17/02; B01D 45/16; C02F 1/40; C02F 2101/32
See application file for complete search history.

(56) References Cited

U.S. PATENT DOCUMENTS

| | | | |
|---|---|---|---|
| 3,200,568 A | 8/1965 | McNeil | |
| 4,203,739 A * | 5/1980 | Erdmannsdorfer | .......................... B01D 46/0024 210/315 |
| 4,298,465 A * | 11/1981 | Druffel | .............. B01D 17/0211 210/304 |
| 4,668,256 A * | 5/1987 | Billiet | .................... B01D 45/08 55/337 |

(Continued)

FOREIGN PATENT DOCUMENTS

| | | |
|---|---|---|
| DE | 102006002975 B4 | 1/2008 |
| EP | 2471588 B1 | 11/2014 |

(Continued)

OTHER PUBLICATIONS

European Patent Office, "International Search Report and Written Opinion", report, dated Jul. 8, 2019, 12 pages, International Searching Authority, Rijswijk, Netherlands.

(Continued)

*Primary Examiner* — Stephen Hobson
(74) *Attorney, Agent, or Firm* — Cheryl Greenly; Brian Kondas; Eugene Clair

(57) ABSTRACT

An effluent processing apparatus comprises a first processing stage in which oil and water are separated from an effluent mixture containing air, oil, and water from a purge valve of an air dryer. The effluent processing apparatus also comprises a second processing stage in which oil is extracted from the separated oil and water of the first processing stage. The effluent processing apparatus further comprises a third processing stage in which air from the first processing stage and water from the second processing stage are combined and exhausted to atmosphere.

16 Claims, 14 Drawing Sheets

(56) References Cited

U.S. PATENT DOCUMENTS

| | | | |
|---|---|---|---|
| 5,002,593 A * | 3/1991 | Ichishita | B60T 17/004 96/137 |
| 5,113,671 A * | 5/1992 | Westermeyer | F25B 43/02 62/468 |
| 5,186,522 A | 2/1993 | Spencer | |
| 6,058,917 A * | 5/2000 | Knowles | F01M 13/04 123/573 |
| 6,109,289 A | 8/2000 | Firth | |
| 6,319,296 B1 | 11/2001 | Fornof | |
| 6,537,339 B2 * | 3/2003 | Schmitz | B01D 46/0001 210/493.1 |
| 6,730,143 B1 * | 5/2004 | Nichols | B01D 53/261 95/118 |
| 7,708,793 B2 | 5/2010 | Fornof | |
| 7,753,069 B2 | 7/2010 | Nichols | |
| 7,789,925 B2 | 9/2010 | Fornof | |
| 9,101,856 B2 | 8/2015 | Quinn | |
| 9,656,198 B2 * | 5/2017 | Sugio | B01D 45/08 |
| 2004/0094036 A1 | 5/2004 | Nichols | |
| 2009/0071188 A1 * | 3/2009 | Kusada | F25B 43/02 62/470 |
| 2011/0113738 A1 * | 5/2011 | Zachos | B01D 45/08 55/320 |
| 2015/0135961 A1 * | 5/2015 | Sugio | F04B 39/04 96/381 |
| 2015/0152763 A1 * | 6/2015 | Sugio | B01D 45/08 55/385.3 |
| 2015/0343356 A1 * | 12/2015 | Sugio | B01D 53/261 55/462 |
| 2016/0001758 A1 * | 1/2016 | Sugio | B60T 17/004 55/426 |
| 2016/0011037 A1 * | 1/2016 | Sugio | F04B 39/04 96/417 |
| 2016/0114777 A1 * | 4/2016 | Tomchak | B01D 46/0036 96/139 |
| 2017/0021300 A1 * | 1/2017 | Sugio | B01D 50/002 |
| 2017/0340997 A1 | 11/2017 | Otsuka | |
| 2019/0099705 A1 * | 4/2019 | Howe | B60T 17/002 |
| 2019/0100190 A1 * | 4/2019 | Howe | B01D 46/16 |
| 2019/0184333 A1 * | 6/2019 | Howe | B01D 53/28 |
| 2019/0329156 A1 * | 10/2019 | Hoffman | B01D 17/045 |
| 2020/0179850 A1 * | 6/2020 | Barger | B01D 45/16 |

FOREIGN PATENT DOCUMENTS

| | | |
|---|---|---|
| EP | 3216509 A1 | 9/2017 |
| FR | 224211 A1 | 10/1974 |
| GB | 1094617 A | 12/1967 |
| JP | 20050664470 A | 3/2005 |

OTHER PUBLICATIONS

Bendix Commercial Vehicle Systems, "SD-08-187 Bendix PuraGuard System Filter," Service Data Sheet, Jul. 2004, 8 pages, Bendix Commercial Vehicle Systems LLC, Elyria Ohio, U.S.A.

Choi, Sung-Jin et al. "A Polymethylsiloxane (PDMS) Sponge for the Selective Absorption of Oil from Water," Paper, Nov. 10, 2011, 5 pages, American Chemical Society, U.S.A.

Parker Hannifin Manufacturing Limited, "OVR Oil Vapour Removal Filter," Product Information Sheet, Apr. 2015, 4 pages, Parker Hannifin Manufacturing Limited, England.

* cited by examiner

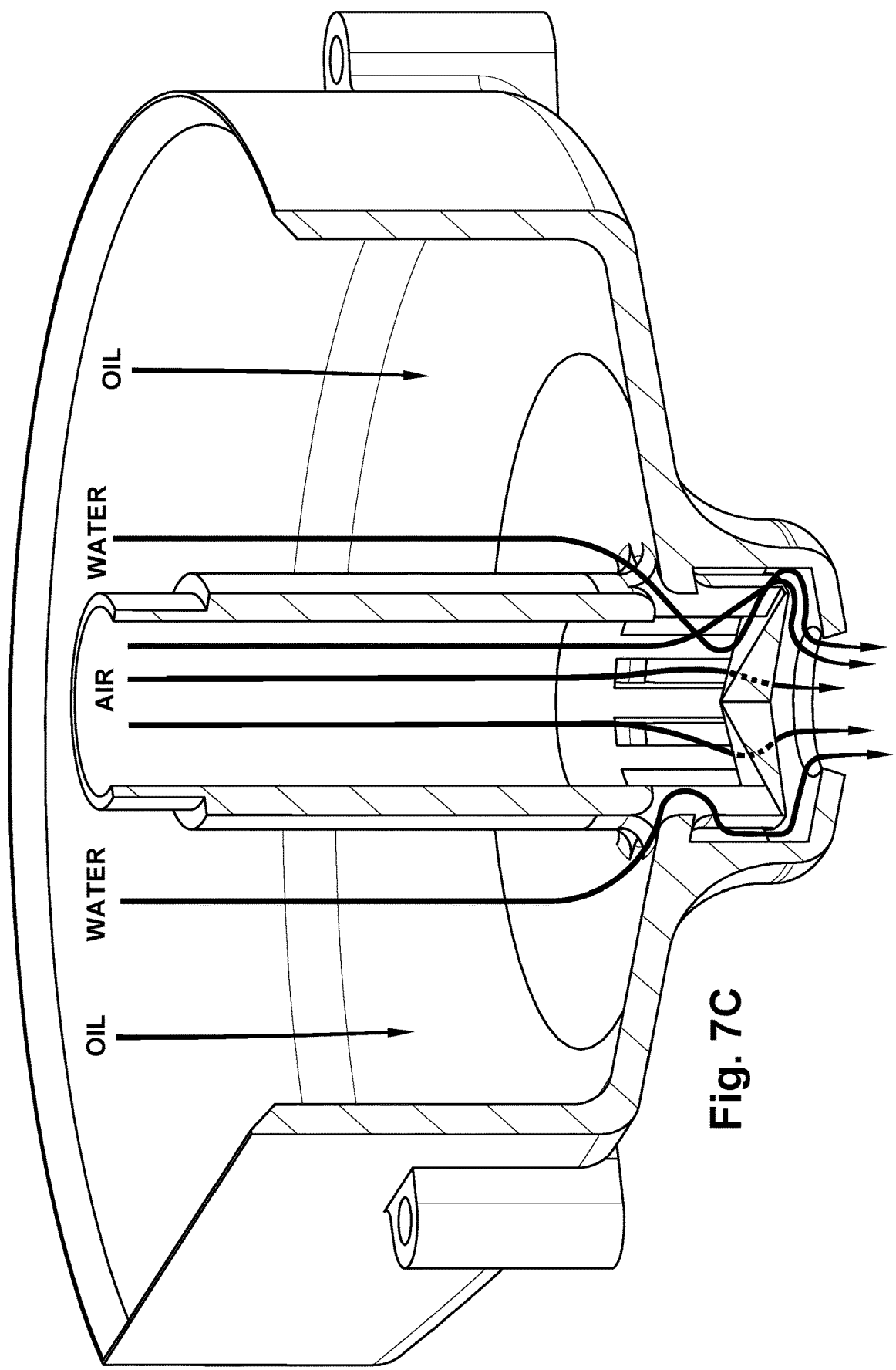

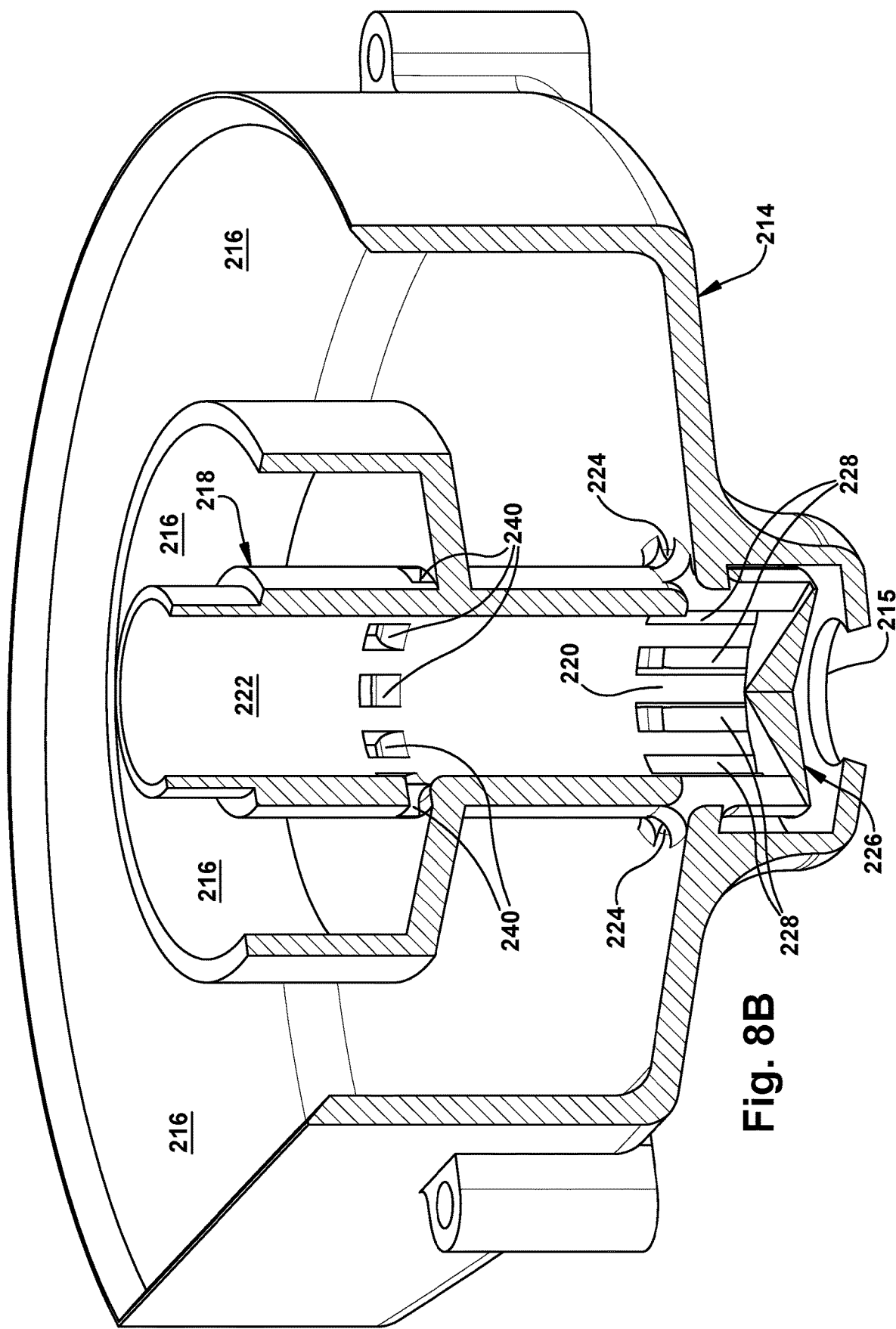

EFFLUENT PROCESSING APPARATUS AND METHOD FOR A VEHICLE AIR BRAKE CHARGING SYSTEM

BACKGROUND

The present application relates to vehicle air brake charging systems, and is particularly directed to an effluent processing apparatus and method for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes both water vapor and oil droplets from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. Accordingly, those skilled in the art continue with research and development efforts in cleaning the purged air from purge valves.

SUMMARY

In accordance with one embodiment, an effluent processing apparatus comprises a first processing stage in which oil and water are separated from an effluent mixture containing air, oil, and water from a purge valve of an air dryer. The effluent processing apparatus also comprises a second processing stage in which oil is extracted from the separated oil and water of the first processing stage. The effluent processing apparatus further comprises a third processing stage in which air from the first processing stage and water from the second processing stage are combined and exhausted to atmosphere.

In accordance with another embodiment, an effluent processing apparatus is provided for a vehicle air brake charging system. The effluent processing apparatus comprises an inlet port through which effluent containing a mixture of air, oil, and water from a purge valve of an air dryer can be received. The effluent processing apparatus also comprises a first portion defining at least in part an effluent channel through which the effluent mixture from the inlet port flows to separate the oil and the water apart from the air, a second portion defining at least in part a sump through which the separated oil and water from the effluent channel flows to extract the oil from the water, and a third portion defining at least in part a chamber into which the air from the effluent channel flows and the water from the sump flows to combine into a single flow stream. The effluent processing apparatus further comprises an outlet port in fluid communication with the chamber and through which the single flow stream of the combined air and water exhausts to atmosphere.

In accordance with yet another embodiment, an effluent processing apparatus is provided for a vehicle air brake charging system having an air dryer purge valve through which an effluent containing a mixture of air, oil, and water flows. The effluent processing apparatus comprises means for separating oil and water from the effluent mixture to provide an air stream substantially devoid of oil and water. The effluent processing apparatus also comprises means for extracting oil from the separated oil and water to provide one or more water streams substantially devoid of oil. The effluent processing apparatus further comprises means for combining the air stream and the one or more water streams into a single stream to atmosphere.

In accordance with still another embodiment, a method is provided of operating an effluent processing apparatus to extract oil from an effluent mixture containing air, oil, and water. The method comprises separating oil and water from the effluent mixture to provide a clean air stream, and extracting oil from the separated oil and water to provide a clean water stream. The method also comprises combining the clean air stream and the clean water stream to provide a single stream, and exhausting the single stream to atmosphere.

BRIEF DESCRIPTION OF THE DRAWINGS

FIG. 7C is a perspective view similar to FIG. 7B, and showing one or more arrows "air" indicating air flow, one or more arrows "oil" indicating oil flow, and one or more arrows "water" indicating water flow through parts of the effluent processing apparatus.

FIG. 8B is a perspective view, looking slightly down from the topside of FIG. 8A, and showing a quarter-view portion of the effluent processing apparatus.

DETAILED DESCRIPTION

Figure 1:
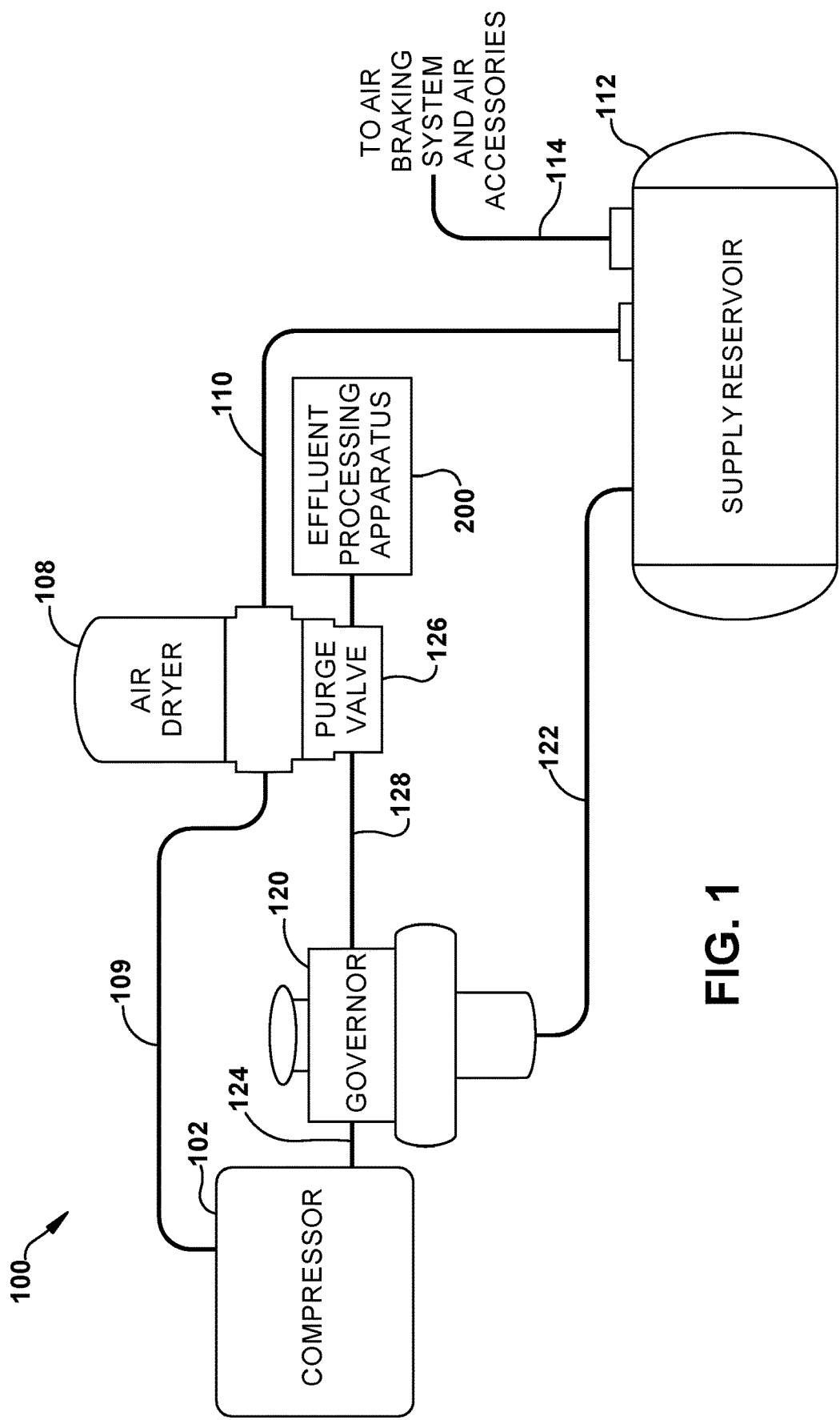
FIG. 1 is a schematic diagram of a vehicle air brake charging system including an example effluent processing apparatus constructed in accordance with an embodiment.

Referring to FIG. 1, a schematic diagram of a vehicle air brake charging system 100 including an example effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2A:
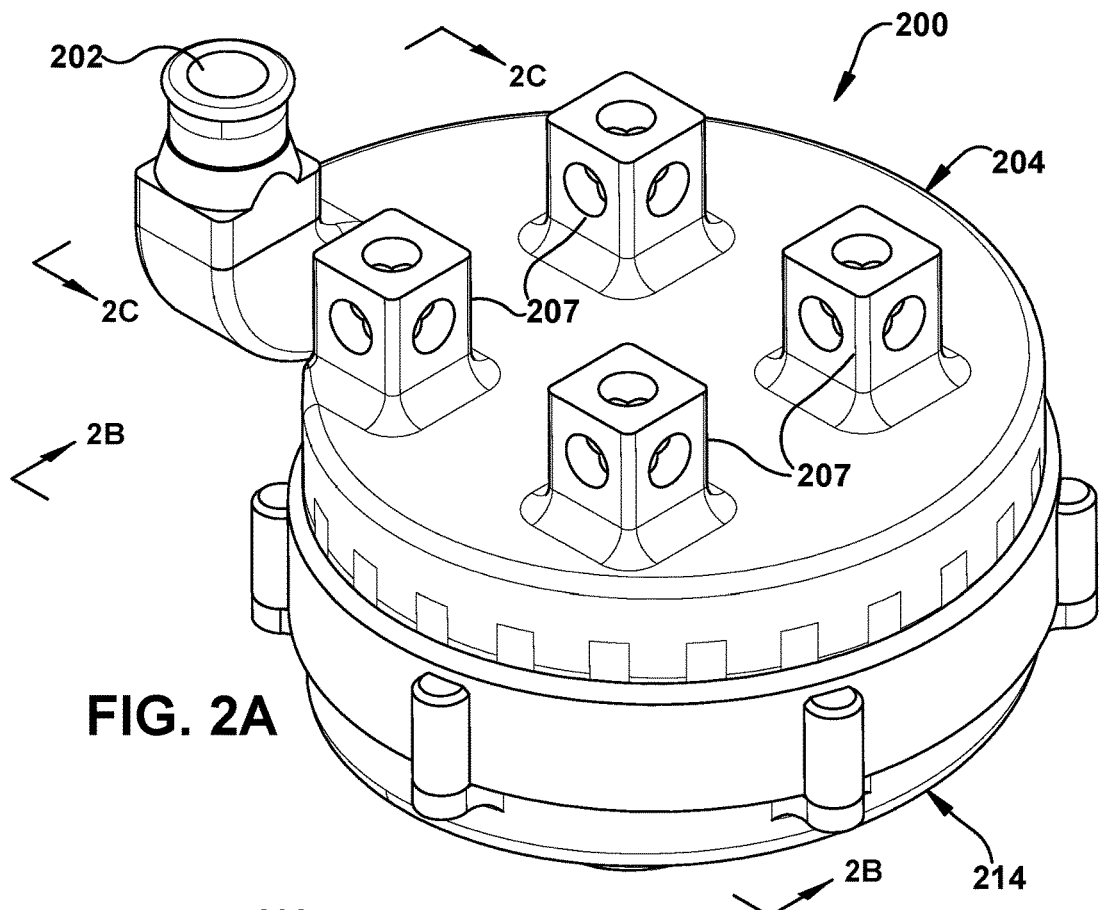
FIG. 2A is a perspective view of the effluent processing apparatus shown in FIG. 1.
Figure 2B:
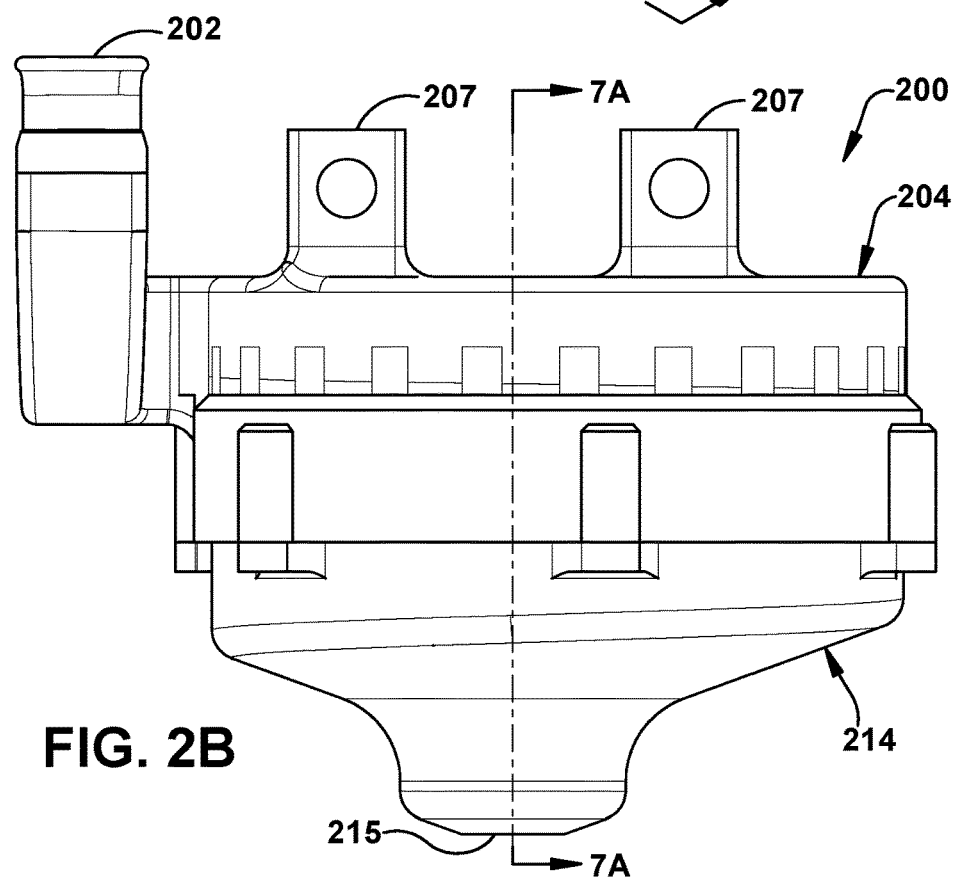
FIG. 2B is a perspective view, looking in the direction approximately along line 2B-2B shown in FIG. 2A, of the effluent processing apparatus.
Figure 2C:
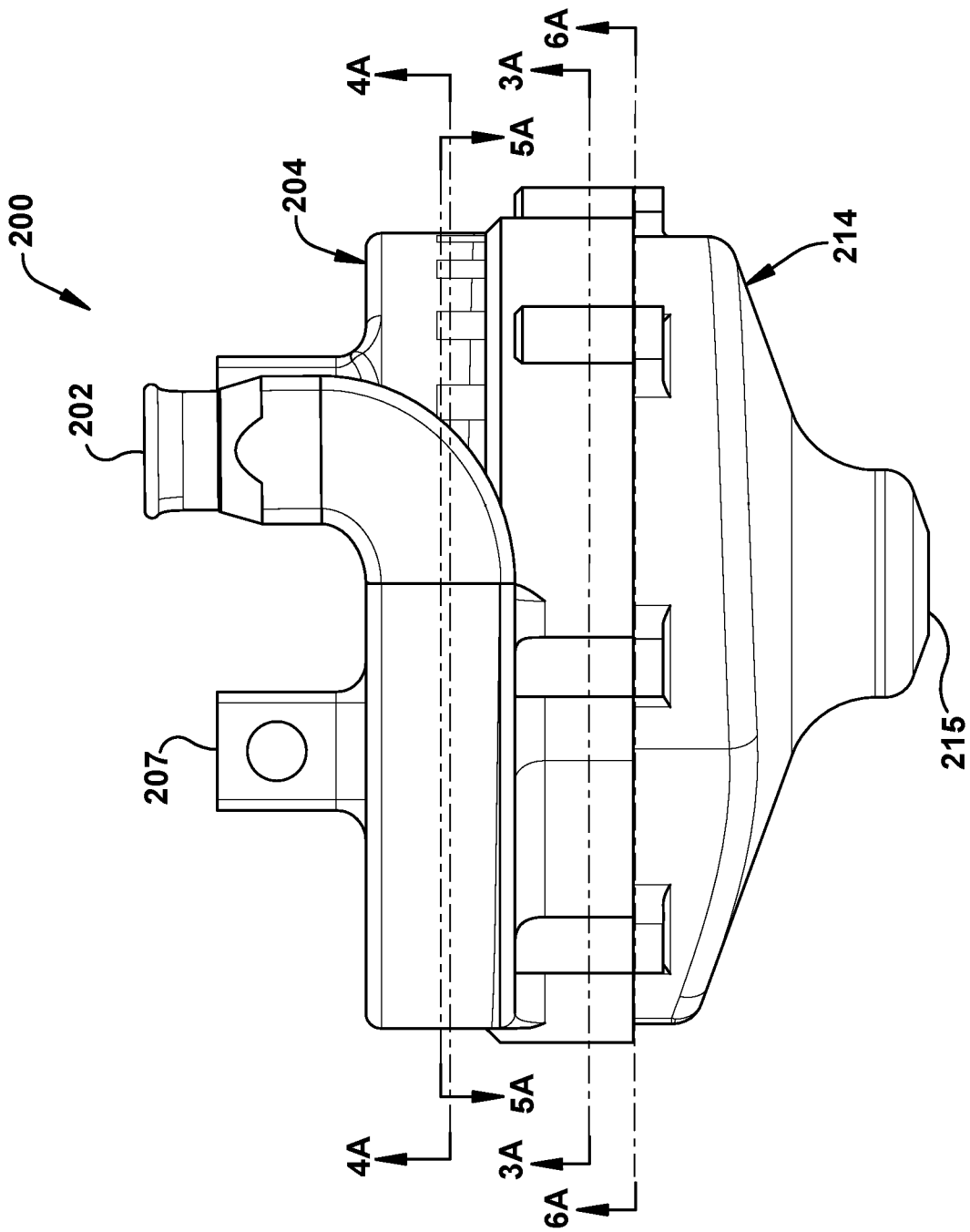
FIG. 2C is a perspective view, looking in the direction approximately along line 2C-2C shown in FIG. 2A, of the effluent processing apparatus.
Figure 2E:
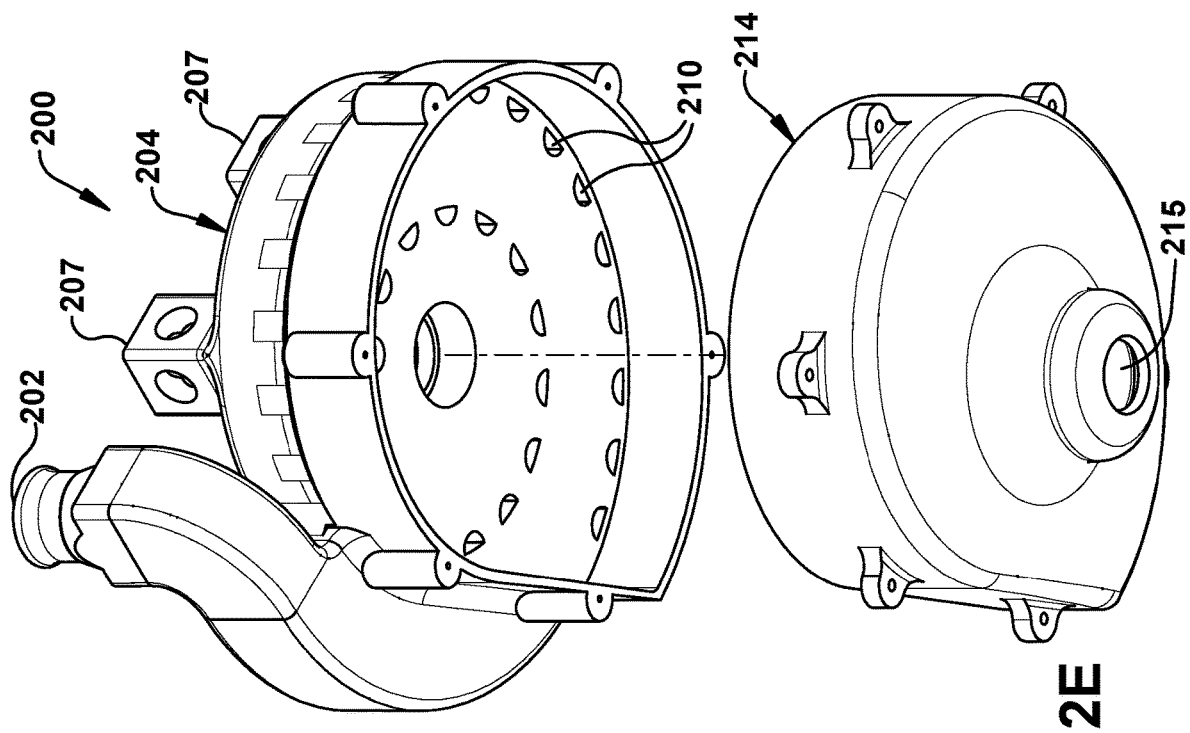
FIG. 2E is another exploded view of the effluent processing apparatus shown in FIG. 1.
Figure 2D:
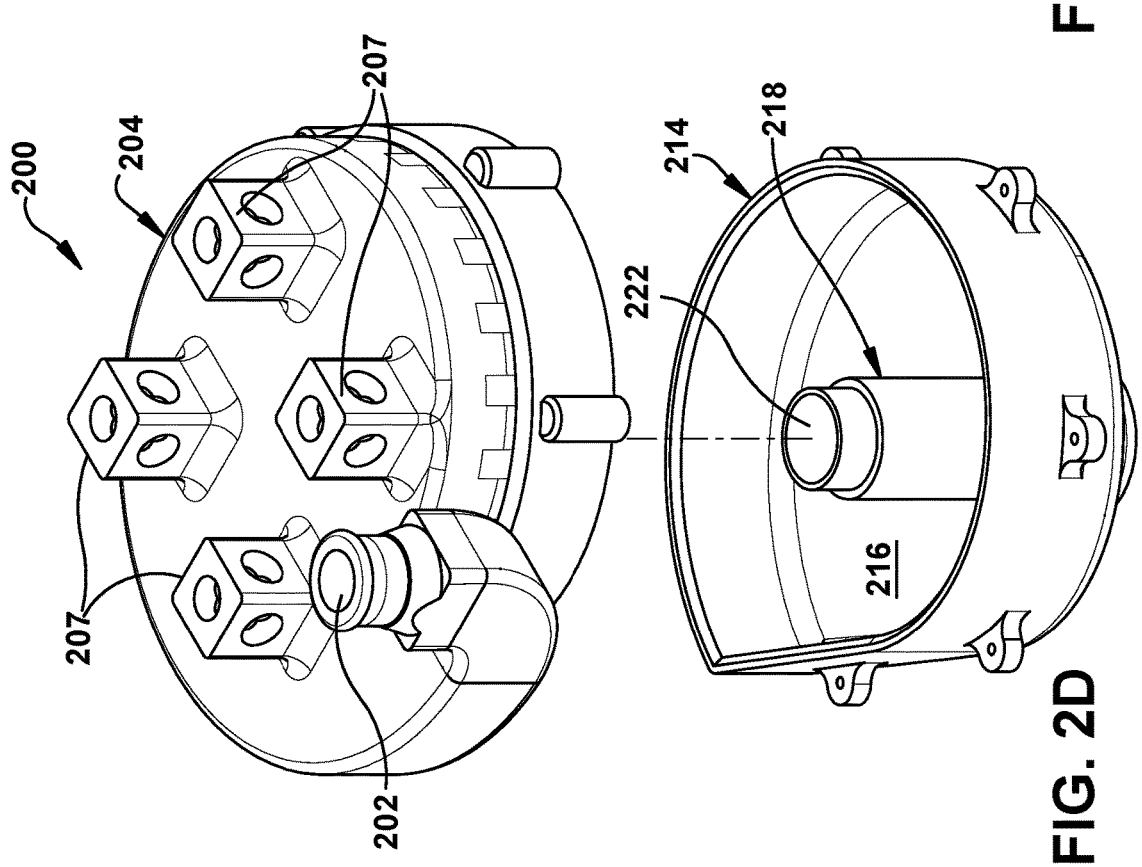
FIG. 2D is an exploded view of the effluent processing apparatus shown in FIG. 1.

Referring to FIG. 2A, a perspective view of the effluent processing apparatus 200 shown in FIG. 1 is illustrated. FIG. 2B is a perspective view, looking in the direction approximately along line 2B-2B shown in FIG. 2A, of the effluent processing apparatus 200. FIG. 2C is a perspective view, looking in the direction approximately along line 2C-2C shown in FIG. 2A, of the effluent processing apparatus 200. FIG. 2D is an exploded view of the effluent processing apparatus 200 shown in FIG. 1. FIG. 2E is another exploded view of the effluent processing apparatus 200 shown in FIG. 1.

Figure 3A:
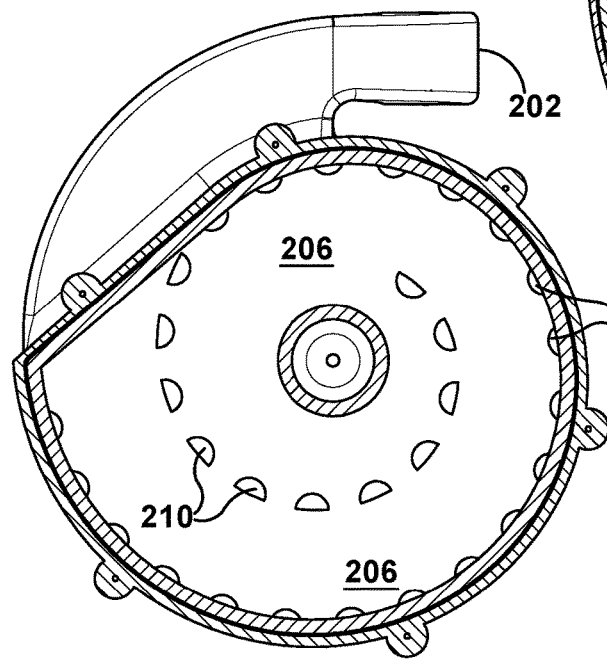
FIG. 3A is a sectional view taken approximately along line 3A-3A shown in FIG. 2C.
Figure 3B:
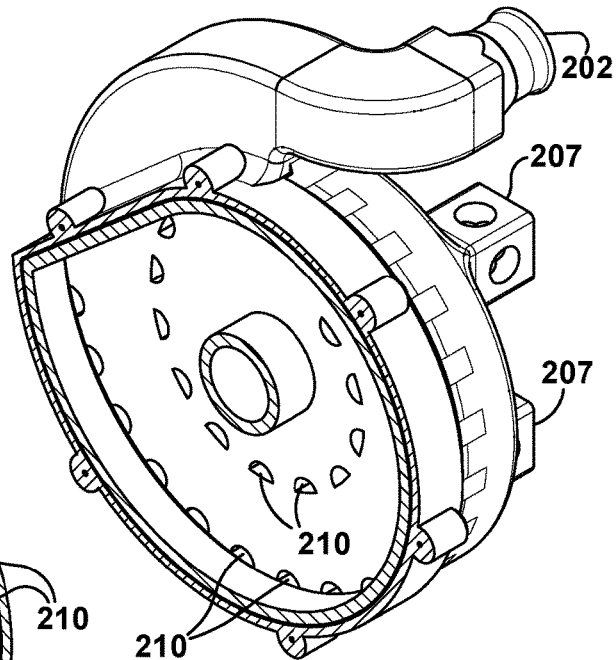
FIG. 3B is a perspective view of the sectional view of FIG. 3A.
Figure 4A:
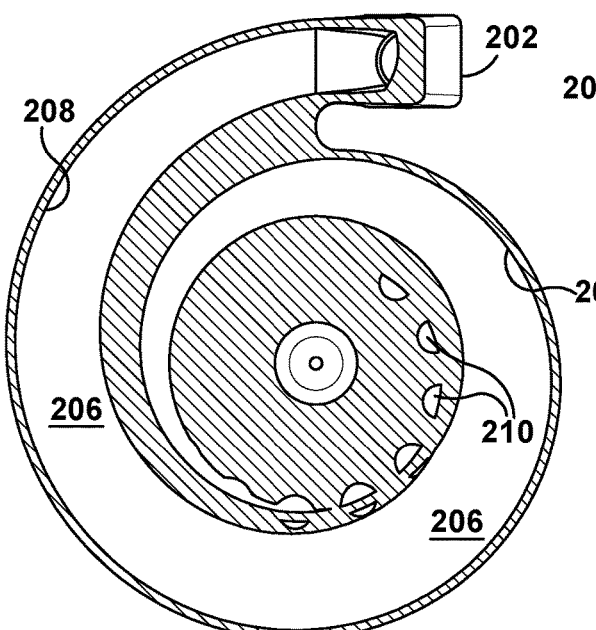
FIG. 4A is a sectional view taken approximately along line 4A-4A shown in FIG. 2C.
Figure 4B:
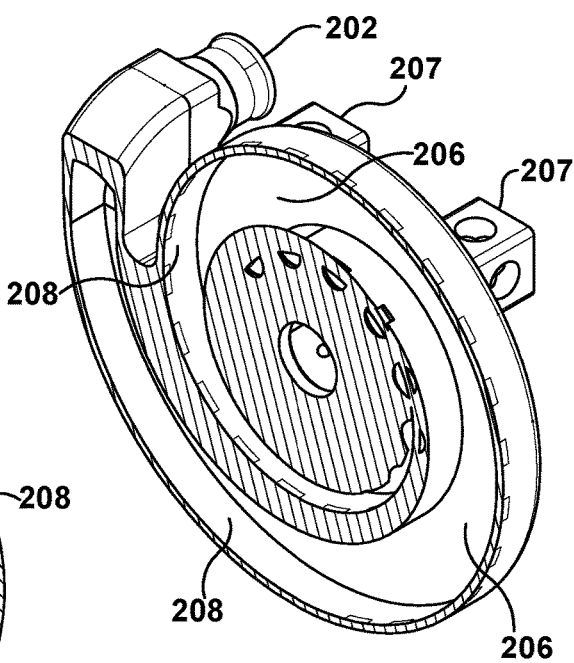
FIG. 4B is a perspective view of the sectional view of FIG. 4A.
Figures 5A, 5B:
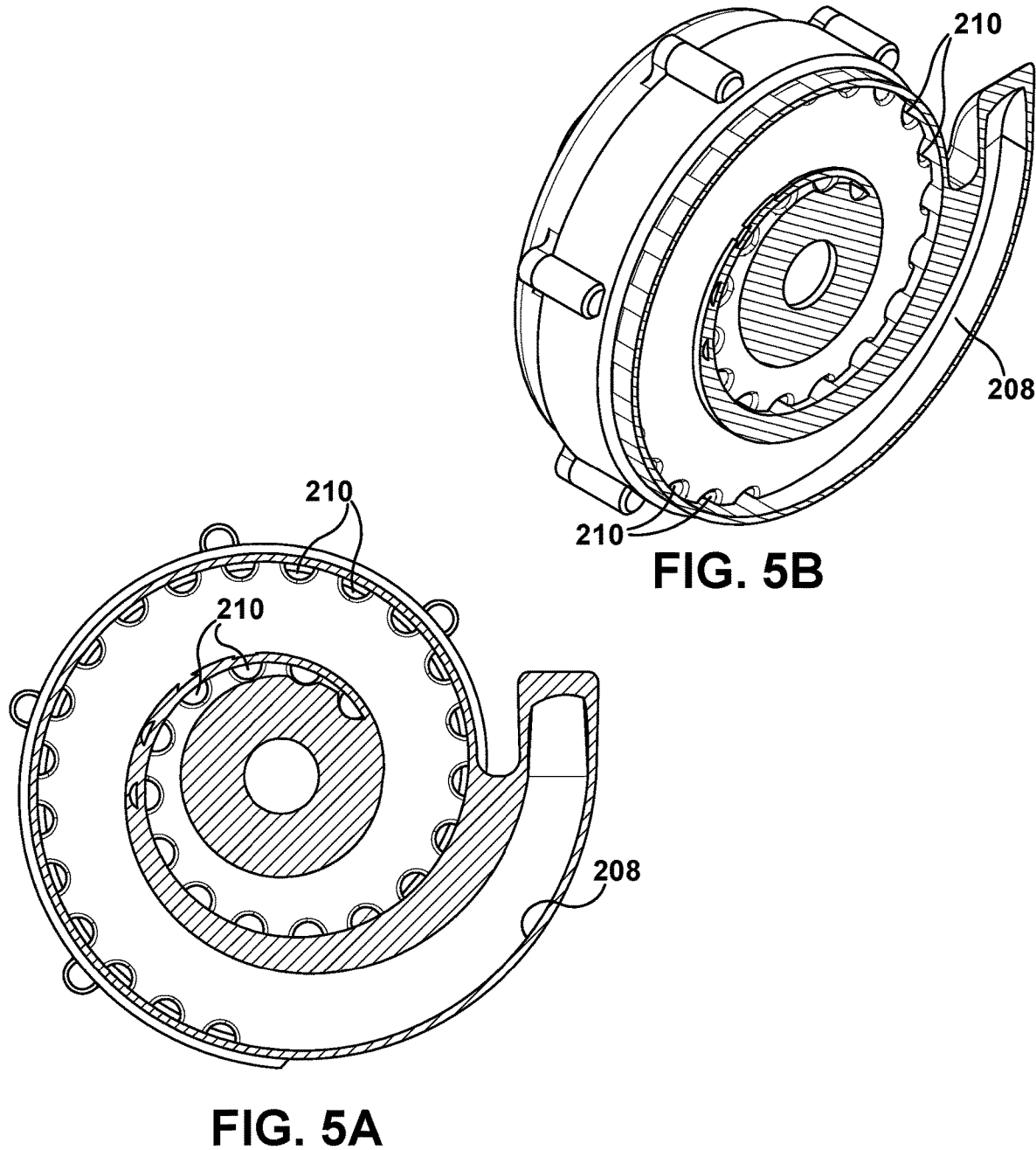
FIG. 5A is a sectional view taken approximately along line 5A-5A shown in FIG. 2C.
FIG. 5B is a perspective view of the sectional view of FIG. 5A.

FIG. 3A is a sectional view taken approximately along line 3A-3A shown in FIG. 2C. FIG. 3B is a perspective view of the sectional view of FIG. 3A. FIG. 4A is a sectional view taken approximately along line 4A-4A shown in FIG. 2C. FIG. 4B is a perspective view of the sectional view of FIG. 4A. FIG. 5A is a sectional view taken approximately along line 5A-5A shown in FIG. 2C. FIG. 5B is a perspective view of the sectional view of FIG. 5A.

Figure 6A:
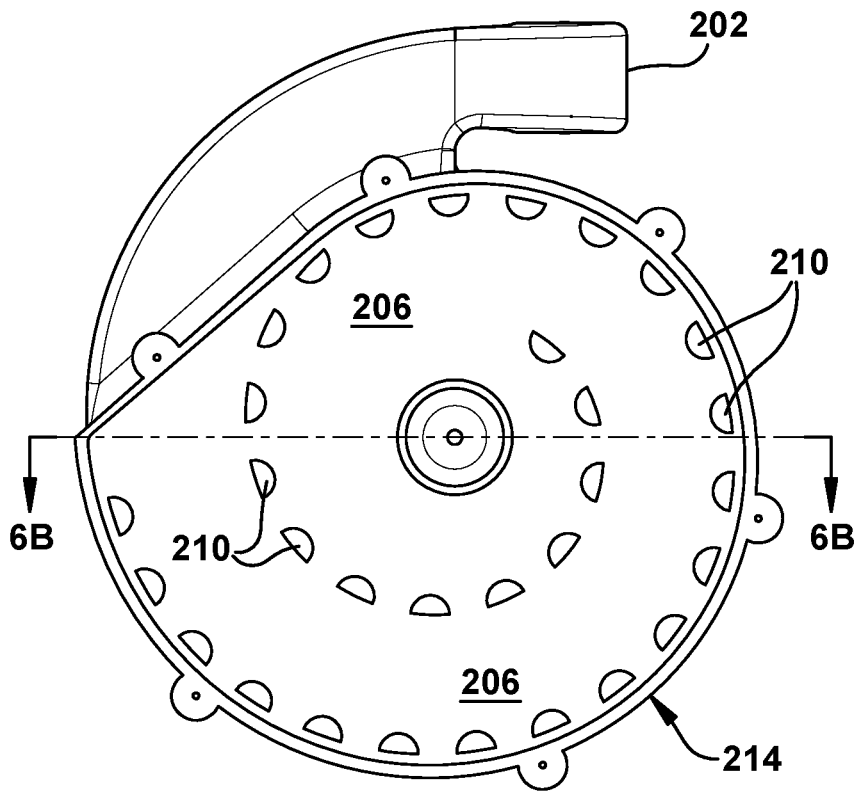
FIG. 6A is a sectional view taken approximately along line 6A-6A shown in FIG. 2C.
Figure 6B:
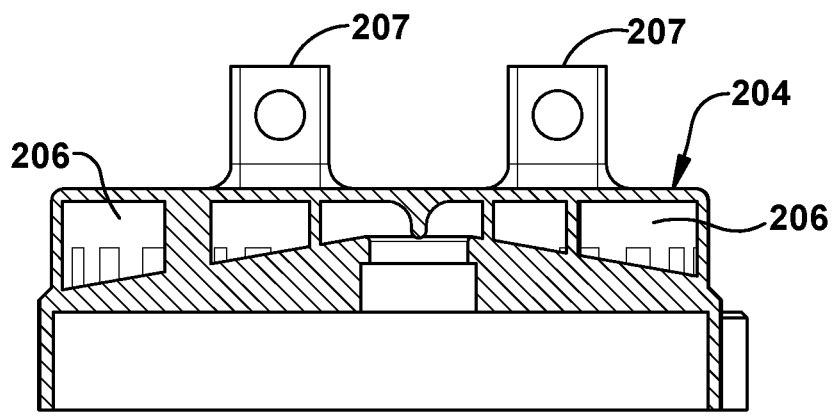
FIG. 6B is a perspective view of the sectional view of FIG. 6A.
Figure 7A:
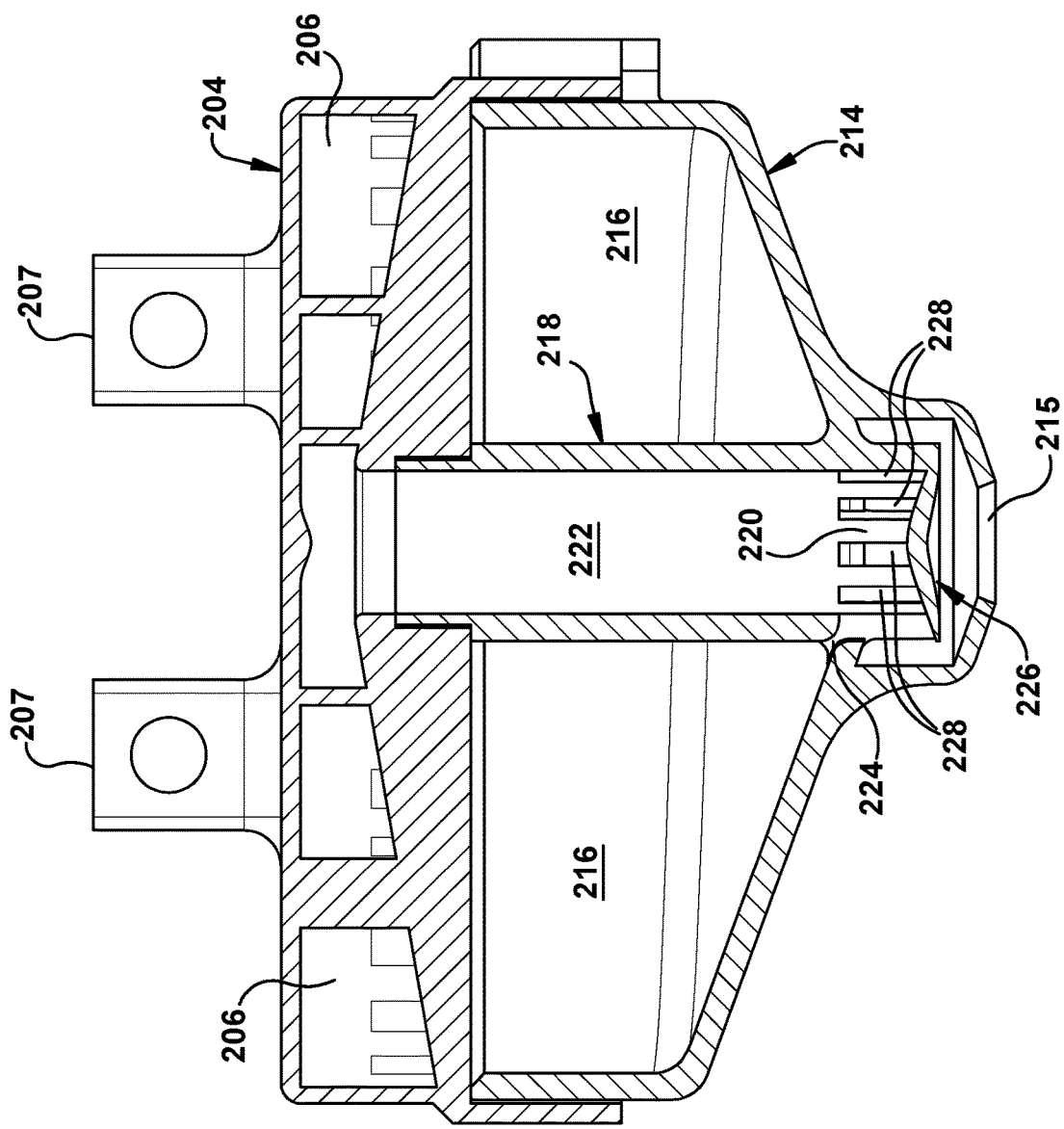
FIG. 7A is a sectional view, taken approximately along line 7A-7A shown in FIG. 2B, and showing a cross-sectional profile of the effluent processing apparatus.
Figure 7B:
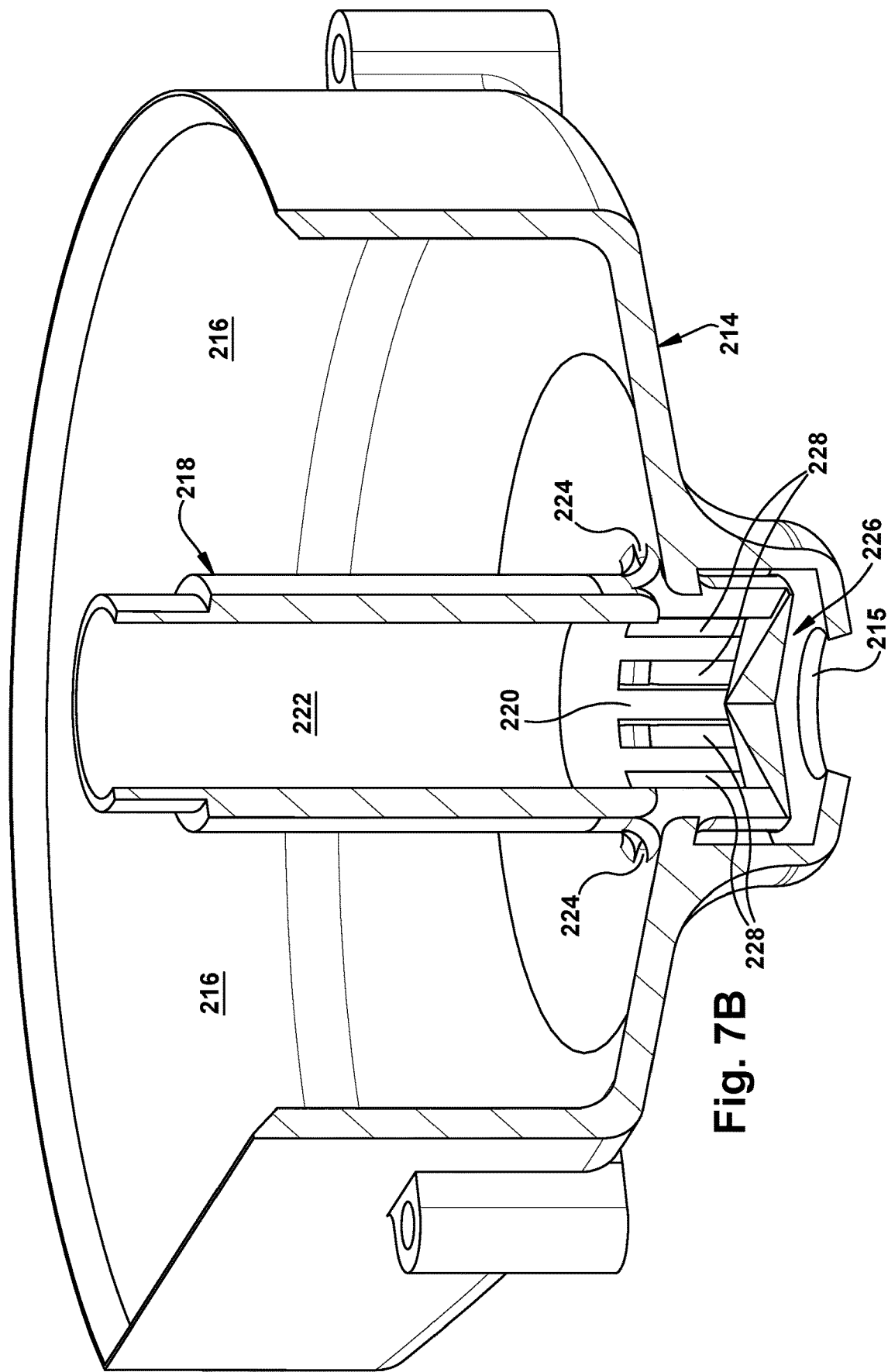
FIG. 7B is a perspective view, looking slightly down from the topside of FIG. 7A, and showing a quarter-view portion of the effluent processing apparatus.

FIG. 6A is a sectional view taken approximately along line 6A-6A shown in FIG. 2C. FIG. 6B is a perspective view of the sectional view of FIG. 6A. FIG. 7A is a sectional view, taken approximately along line 7A-7A shown in FIG. 2B, and showing a cross-sectional profile of the effluent processing apparatus 200. FIG. 7B is a perspective view, looking slightly down from the topside of FIG. 7A, and showing a quarter-view portion of the effluent processing apparatus 200. FIG. 7C is a perspective view similar to FIG. 7B, and showing one or more arrows "air" indicating air flow and one or more arrows "water" indicating water flow through the effluent processing apparatus.

Referring to the figures and in particular to FIGS. 2A, 4A, and 4B, the effluent processing apparatus 200 includes an inlet port 202 through which effluent containing a mixture of air, oil, and water from the purge valve 126 (FIG. 1) of the air dryer 108 can be received. Alternatively, the effluent may be received from any device that collects air, water, and contaminants. The effluent processing apparatus 200 includes a first portion 204 that defines at least in part an effluent channel 206 through which the effluent mixture flows to separate the oil and the water apart from the air. More specifically, the effluent channel 206 comprises a spiral-shaped effluent channel through which the effluent mixture flows to separate oil and water from the effluent mixture.

The first portion 204 has a number of mounting blocks 207 for enabling the effluent processing apparatus 200 to be mounted to the vehicle. The mounting blocks 207 may be of any number or any configuration. The effluent processing apparatus 200 may be affixed directly to an air dryer or may be located remotely. The effluent processing apparatus 200 is intended to be mounted horizontally to promote the flow of separated oil and water from the spiral-shaped effluent channel 206. Example overall physical dimensions of the effluent processing apparatus 200 are about eight inches (20.32 centimeters) in diameter and about six inches (15.24 centimeters) in height. A minimum diameter would be about three inches (7.62 centimeters) to provide a sufficient flow path and to avoid back pressure. In some embodiments, the entire effluent processing apparatus 200 comprises plastic material.

The spiral-shaped channel 206 includes a continuous wall 208 that is provided for extracting oil and water from the effluent mixture as the effluent mixture flows through the spiral-shaped channel 206. More specifically, the oil and water in the effluent mixture impact the continuous wall 208 due to centrifugal force. As a result, the oil and water adhere to the continuous wall 208 and eventually drain through floor openings 210. The floor openings 210 are distributed along the extent of the spiral-shaped channel 206 to form a spiral-shaped drainage pattern.

Referring to the figures and in particular to FIGS. 7A and 7B, the effluent processing apparatus 200 further includes a second portion 214 that defines an outlet port 215 and at least in part a sump 216 through which the separated oil and water from the effluent channel 206 flows to extract the oil from the water. The sump 216 is disposed below the spiral-shaped channel 206, and is provided for receiving the separated oil and water from the spiral-shaped channel 206. More specifically, the sump 216 contains filtration media (not shown) that may include a sponge material, for example. Other filtration media can be used. When the separated oil and water from the spiral-shaped effluent channel 206 passes through the sump 216, the filtration media extracts and holds the oil until the filtration media or the sump 216 or both, are replaced.

The effluent processing apparatus 200 also includes a third portion 218 that is in the form of a substantially cylinder-shaped member. A chamber 220 is defined at least in part at one end of the cylinder-shaped member 218, and a substantially cylinder-shaped volume 222 is defined at opposite end of the cylinder-shaped member 218. The remaining air (i.e., the air after the oil and water are removed in the effluent channel 206) flows from the spiral-shaped channel 206 through the cylinder-shaped volume 222 to chamber 220. The chamber 220 is in fluid communication with the outlet port 215.

The one end of the cylinder-shaped member 218 has a first series 224 of openings through which water from the sump 216 flows into the chamber 220. The water from the sump 216 and the remaining air from the spiral-shaped channel 206 combine in the chamber 220 to provide a single flow stream. The openings in the first series 224 of openings are circumferentially spaced around the cylinder-shaped member 218. As such, a spoke-pattern structure interconnects the cylinder-shaped member 218 and the second portion 214 in the vicinity of the first series 224 of openings.

The effluent processing apparatus 200 further comprises a fourth portion 226 that is disposed between the chamber 220 and the outlet port 215 such that the fourth portion 226 deflects debris from the atmosphere to prevent the debris from flowing into the chamber 220. More specifically, the fourth portion 226 comprises a cone-shaped plate in which apex of the cone-shaped plate points towards the chamber 220 and away from the outlet port 215. The cone-shaped plate 226 is connected to the one end of the cylinder-shaped member 218 such that the cone-shaped plate 226 defines at least in part the chamber 220. The cone-shaped plate 226 has a diameter that is larger than the diameter of the outlet port 215.

The one end of the cylinder-shaped member 218 also has a second series 228 of openings through which the single flow stream of the combined air and water flows out of the chamber 220 and through the outlet port 215 to atmosphere. The second series 228 of openings is disposed below the first series 224 of openings. The openings in the second series 228 of openings are circumferentially spaced around the cone-shaped plate 226. As such, a spoke-pattern structure interconnects the cone-shaped plate 226 and the cylinder-shaped member 218 in the vicinity of the second series 228 of openings. The cone-shaped plate 226 is suspended from the cylinder-shaped member 218 (best shown in FIG. 7B).

The cone-shaped member 226 provides a surface against which the single flow stream of the combined air and water in the chamber 220 can be deflected downwards and outwards towards the outlet port 215. The cone shape facilitates the single flow stream to flow from the chamber 220 around the outer edge of the cone-shaped plate 226 to the outlet port 215. The cleaned air and water in the single flow stream then passes through the outlet port 215 to atmosphere. The result is cleaner air being expelled to atmosphere, and less oil being deposited and accumulated on roadways.

Referring to FIG. 7C, a perspective view similar to FIG. 7B is illustrated. In particular, FIG. 7C show one or more arrows "air" indicating air flow, one or more arrows "oil" indicating oil flow, and one or more arrows "water" indicating water flow through parts of the effluent processing apparatus 200. For clarity of visualization, only arrows (i.e., no reference numerals) are shown in FIG. 7C. The one or more "air" arrows and the one or more "water" arrows combine into the single flow stream, which is subsequently exhausted to atmosphere, as previously described. The one or more arrows "oil" terminate in the sump 216 as oil is retained in the sump 216.

Figure 8A:
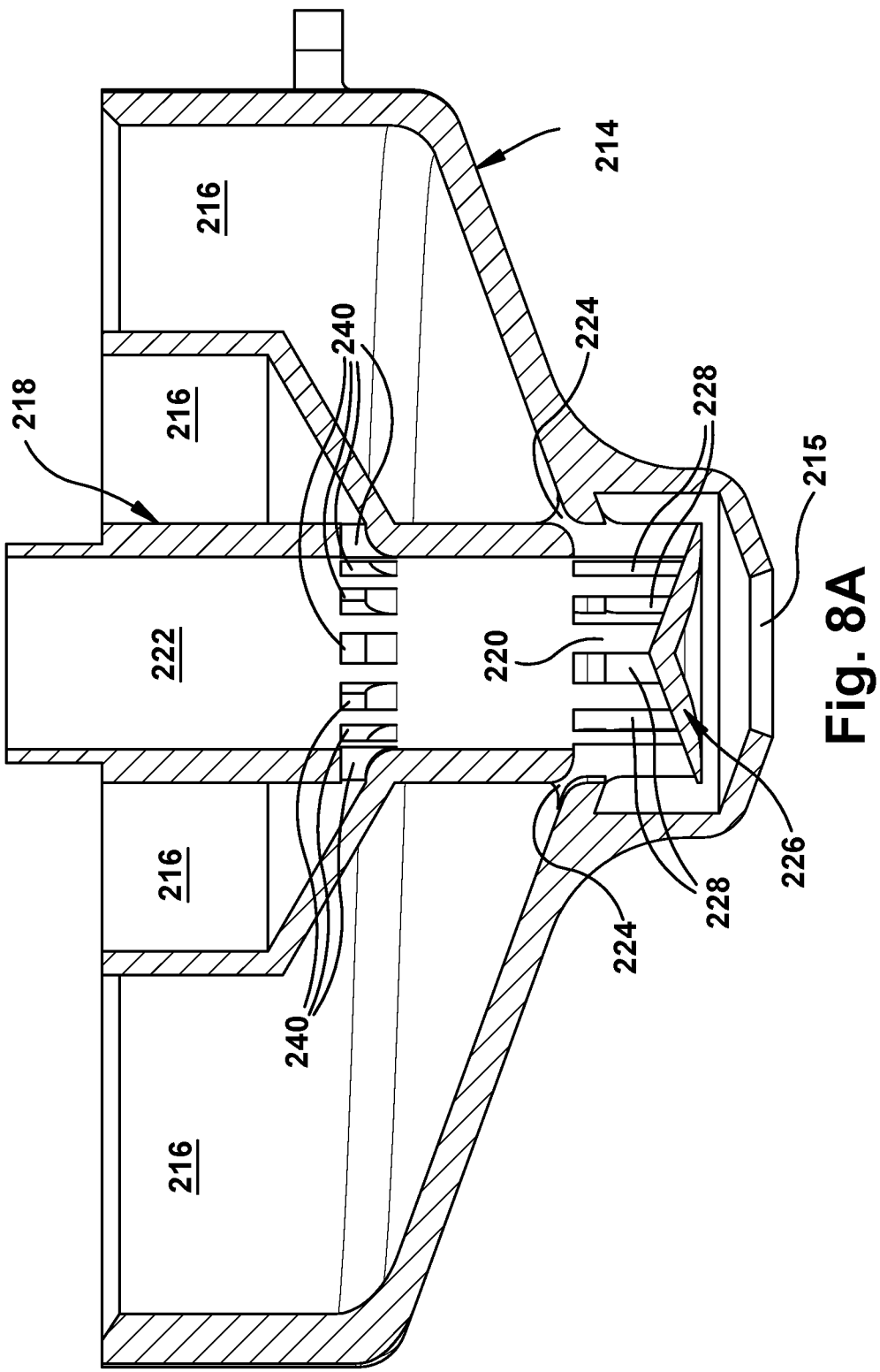
FIG. 8A a sectional view similar to FIG. 7A, and showing a cross-section profile of the effluent processing apparatus in accordance with another embodiment.

Referring to FIG. 8A, a sectional view similar to FIG. 7A shows a cross-section profile of the effluent processing apparatus 200 in accordance with another embodiment. FIG. 8B is a perspective view, looking slightly down from the topside of FIG. 8A, and showing a quarter-view portion of the effluent processing apparatus 200.

Figure 8C:
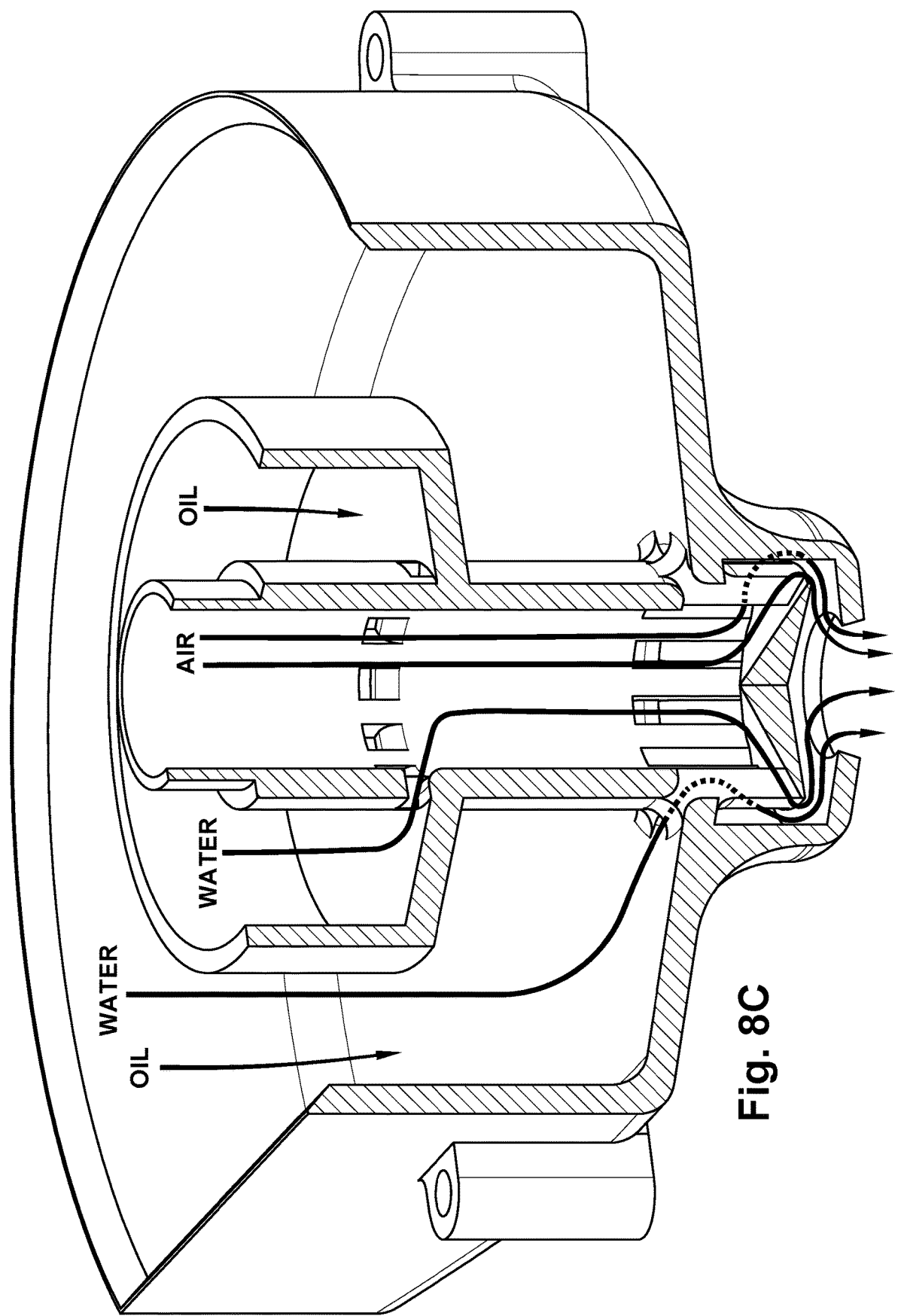
FIG. 8C is a perspective view similar to FIG. 8B, and showing one or more arrows "air" indicating air flow, at least two arrows "oil" indicating oil flow, and at least two arrows "water" indicating water flow through parts of the effluent processing apparatus.

In another example, it is conceivable that the cylinder-shaped member 218 has a third series 240 of openings through which water from the sump 216 flows into the chamber 220. The third series 240 of openings is disposed above the first series 224 of openings and between the opposite ends of the cylinder-shaped member 218. In the embodiment of FIGS. 8A-8C, some water from the sump 216 flows through the first series 224 of openings and some water from the sump 216 flows through the third series 240 of openings. The water from the first series 224 of openings and the water from the third series 240 of openings combine with the air from the second series 228 of openings to provide the single flow stream, which flows around the cone-shaped plate 226 through the outlet port 215 to atmosphere.

The openings in the third series 240 of openings are circumferentially spaced around the cylinder-shaped member 218. As such, a spoke-pattern structure interconnects the cylinder-shaped member 218 and the second portion 214 in the vicinity of the third series 240 of openings. Although two series of openings (i.e., the first series 224 of openings and the third series 240 of openings) are provided through which water from the sump 216 flows, it is conceivable more than two series of openings be provided through which water from the sump 216 can flow. Such an arrangement allows for the drainage of multiple water streams through the single outlet port 215.

Referring to FIG. 8C, a perspective view similar to FIG. 8B is illustrated. FIG. 8C shows one or more arrows "air" indicating air flow, at least two arrows "oil" indicating air flow, and at least two arrows "water" indicating water flow through parts of the effluent processing apparatus 200. For clarity of visualization, only arrows (i.e., no reference numerals) are shown in FIG. 8C. The one or more "air" arrows and the at least two "water" arrows (i.e., the water flowing through the first series 224 of openings and the third series 240 of openings shown in FIG. 8B) combine into a single flow stream, which is subsequently exhausted to atmosphere. The at least two "oil" arrows terminate in the sump 216 as oil is retained in the sump 216.

Figure 9:
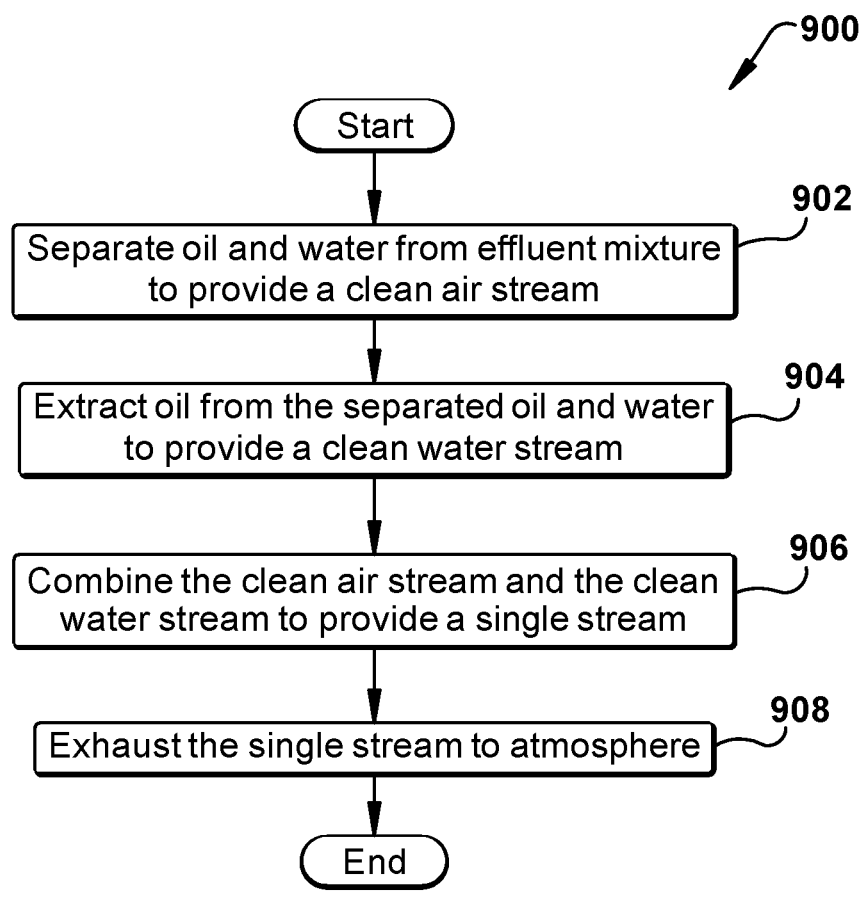
FIG. 9 is a flow diagram depicting a method of operating an effluent processing apparatus in accordance with an embodiment.

Referring to FIG. 9, a flow diagram 900 depicting a method of operating an effluent processing apparatus in accordance with an embodiment is illustrated. In particular, a method is provided of operating an effluent processing apparatus to extract oil from an effluent mixture containing air, oil, and water.

In block 902, oil and water are separated from the effluent mixture to provide a clean air stream. In block 904, oil is extracted from the separated oil and water to provide a clean water stream. Then, in block 906, the clean air stream and the clean water stream are combined to provide a single stream. The process proceeds to block 908 in which the single stream is exhausted to atmosphere. The process then ends.

It should be apparent that the effluent processing apparatus 200 has three volumes. The effluent channel 206 has a substantially spiral-shaped volume through which the effluent mixture flows. The sump 216 has a substantially donut-shaped volume through which the separated oil and water from the effluent channel 206 flows. The chamber 220 has a substantially cylinder-shaped volume through which the single flow stream flows.

It should also be apparent that the effluent processing apparatus 200 has three processing stages. The spiral-shaped channel 206 provides a first processing stage, the sump 216 provides a second processing stage, and the chamber 220 provides a third processing stage. In the first processing stage, oil and water are separated from an effluent mixture containing air, oil, and water from the purge valve 126 (FIG. 1) of the air dryer 108. In the second processing stage, oil is extracted from the separated oil and water of the first processing stage. In the third processing stage, air from the first processing stage and water from the second processing stage are combined and subsequently exhausted to atmosphere.

It should further be apparent that a means is provided for separating oil and water from the effluent mixture to provide an air stream substantially devoid of oil and water. A means is also provided for extracting oil from the separated oil and water to provide one or more water streams substantially devoid of oil. A means is further provided for combining the air stream and the one or more water streams into a single stream to atmosphere. In some embodiments, a means is provided for deflecting backflow of debris from the atmosphere. In some embodiments, the means for extracting oil from the separated oil and water to provide one or more water streams substantially devoid of oil includes means for extracting oil from the separated oil and water to provide at least two water streams substantially devoid of oil (e.g., the embodiment shown in FIGS. 8A, 8B, and 8C). Accordingly, it is conceivable that the effluent processing apparatus 200 be constructed to process waste streams (e.g., oil and water) from other devices.

It should further be apparent that the second portion 214 forms a baffle housing having a baffle exit (i.e., the outlet port 215) through which clean air and water are exhausted to atmosphere. The relatively larger diameter cone-shaped plate 226 acts as a baffle to prevent outside debris that has passed through the relatively smaller diameter baffle exit 215 from reaching components inside the effluent processing apparatus 200. Moreover, a single central exhaust is provided that terminates at the cone-shaped plate 226 to provide an integrated exhaust that is protected from outside debris by the cone-shaped plate 226. By providing only a single central exhaust through which both clean air and water can be vented to atmosphere, the task of preventing outside debris from reaching inside the effluent processing apparatus 200 is simplified.

It should also be apparent that the effluent processing apparatus 200 has a shape with a relatively low profile and relatively small overall physical dimensions. This allows the effluent processing apparatus 200 to be more easily installed in applications where available installation space is relatively tight. It is conceivable that the effluent processing apparatus 200 may have other profile shapes and other overall physical dimensions depending upon the needs of the particular application.

Although the above-description describes the effluent processing apparatus 200 being used in a heavy vehicle such as a truck, it is conceivable that the effluent processing apparatus 200 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An effluent processing apparatus comprising:
    a first processing stage in which oil and water are separated from an effluent mixture containing air, oil, and water from a purge valve of an air dryer;
    a second processing stage in which oil is extracted from oil and water separated in the first processing stage having a sump containing filtration media for holding extracted oil until the extracted oil can be removed from the sump; and
    a third processing stage in which air from the first processing stage and water from the second processing stage are combined and exhausted to atmosphere.

2. An effluent processing apparatus according to claim 1, wherein the third processing stage includes a cone-shaped plate that deflects debris in the atmosphere to prevent the debris from flowing through the third processing stage into the first and second processing stages.

3. An effluent processing apparatus according to claim 2, wherein the cone-shaped plate includes an apex pointing towards the first and second processing stages.

4. An effluent processing apparatus according to claim 1, wherein the first processing stage includes a spiral-shaped effluent channel through which the effluent mixture flows to separate oil and water from the effluent mixture.

5. An effluent processing apparatus according to claim 1, wherein (i) the first processing stage has a substantially spiral-shaped volume through which the effluent mixture flows, (ii) the second processing stage has a substantially donut-shaped volume through which the separated oil and water from the effluent channel flows, and (iii) the third processing stage has a substantially cylinder-shaped volume through which the combined air and water flows.

6. An effluent processing apparatus according to claim 1, wherein the effluent processing apparatus comprises plastic material.

7. An effluent processing apparatus for a vehicle air brake charging system, the effluent processing apparatus comprising:
    an inlet port through which effluent containing a mixture of air, oil, and water from a purge valve of an air dryer can be received;
    a first portion defining at least in part an effluent channel through which the effluent mixture from the inlet port flows to separate the oil and the water apart from the air;

a second portion defining at least in part a sump through which the separated oil and water from the effluent channel flows to extract the oil from the water;

a third portion defining at least in part a chamber into which the air from the effluent channel flows and the water from the sump flows to combine into a single flow stream; and an outlet port in fluid communication with the chamber and through which the single flow stream of the combined air and water exhausts to atmosphere.

8. An effluent processing apparatus according to claim 7, further comprising:

a fourth portion disposed between the chamber and the outlet port such that the fourth portion deflects debris in the atmosphere to prevent the debris from flowing into the chamber.

9. An effluent processing apparatus according to claim 8, wherein the fourth portion comprises a cone-shaped plate in which an apex of the cone-shaped plate points towards the chamber and away from the outlet port such that the single flow stream is facilitated to flow from the chamber around the cone-shaped plate to the outlet port to atmosphere.

10. An effluent processing apparatus according to claim 9, wherein (i) the third portion comprises a cylinder-shaped member defining a substantially cylinder-shaped volume through which the air from the effluent channel flows to the chamber to combine with the water from the sump to provide the single flow stream, (ii) the chamber is defined at one end of the cylinder-shaped member, and (iii) the cylinder-shaped volume is defined at an opposite end of the cylinder-shaped member.

11. An effluent processing apparatus according to claim 10, wherein the cone-shaped plate is connected to one end of the cylinder-shaped member such that the cone-shaped plate defines at least in part the chamber.

12. An effluent processing apparatus according to claim 11, wherein (i) the one end of the cylinder-shaped member has a first series of openings through which water from the sump flows into the chamber, (ii) the one end of the cylinder-shaped member has a second series of openings through which the single flow stream of the combined air and water flows out of the chamber around the cone-shaped plate to the outlet port to atmosphere, and (iii) the second series of openings is disposed below the first series of openings.

13. An effluent processing apparatus according to claim 12, wherein (i) the cylinder-shaped member has a third series of openings through which water from the sump flows into the chamber, and (ii) the third series of openings is disposed above the first series of openings and between the opposite ends of the cylinder-shaped member.

14. An effluent processing apparatus according to claim 13, wherein the openings in each of the first, second, and third series of openings are circumferentially spaced around the cylinder-shaped member.

15. An effluent processing apparatus according to claim 7, wherein the second portion defines the outlet port that is in fluid communication with the chamber.

16. An effluent processing apparatus according to claim 7, wherein (i) the effluent channel has a substantially spiral-shaped volume through which the effluent mixture flows, (ii) the sump has a substantially donut-shaped volume through which the separated oil and water from the effluent channel flows, and (iii) the chamber has a substantially cylinder-shaped volume through which the single flow stream flows.

* * * * *